United States Patent [19]

Dodge et al.

[11] 4,266,866
[45] May 12, 1981

[54] DIFFUSION TRANSFER CAMERA PROCESSOR

[75] Inventors: Dennis Dodge, Amherst, N.H.; Paul Matwey, Henrietta, N.Y.; Thomas M. Madigan, Pittsford, N.Y.; Robert H. Powers, Rochester, N.Y.

[73] Assignee: Itek Corporation, Lexington, Mass.

[21] Appl. No.: 86,929

[22] Filed: Oct. 22, 1979

[51] Int. Cl.³ .............................................. G03B 17/50
[52] U.S. Cl. ........................................ 354/84; 354/90; 354/211; 354/301
[58] Field of Search .................... 354/84, 90, 93, 211, 354/301, 302, 305, 320, 322, 83, 89, 91, 92; 355/27, 28

[56] References Cited

U.S. PATENT DOCUMENTS 3,003,871  10/1961  Land et al. ............................ 354/87
3,203,335   8/1965  Wanielista et al. ................... 354/301
3,257,926   6/1966  Stievenart et al. ................... 354/301
3,695,163  10/1972  Stievenart ............................ 354/302

FOREIGN PATENT DOCUMENTS 1135294  8/1962  Fed. Rep. of Germany .......... 354/305
 978767  3/1963  United Kingdom .................... 354/305

Primary Examiner—L. T. Hix
Assistant Examiner—Alan Mathews
Attorney, Agent, or Firm—Homer O. Blair; Robert L. Nathans; Gerald H. Glanzman

[57] ABSTRACT

The disclosure is directed to an extremely compact camera-processor which is configured to sharply reverse the direction of the exposed light sensitive sheet as it leaves the exposure plane. The light sensitive sheet is thereafter driven downwardly into a processor bath along with a relatively flimsy receptor sheet.

15 Claims, 1 Drawing Figure

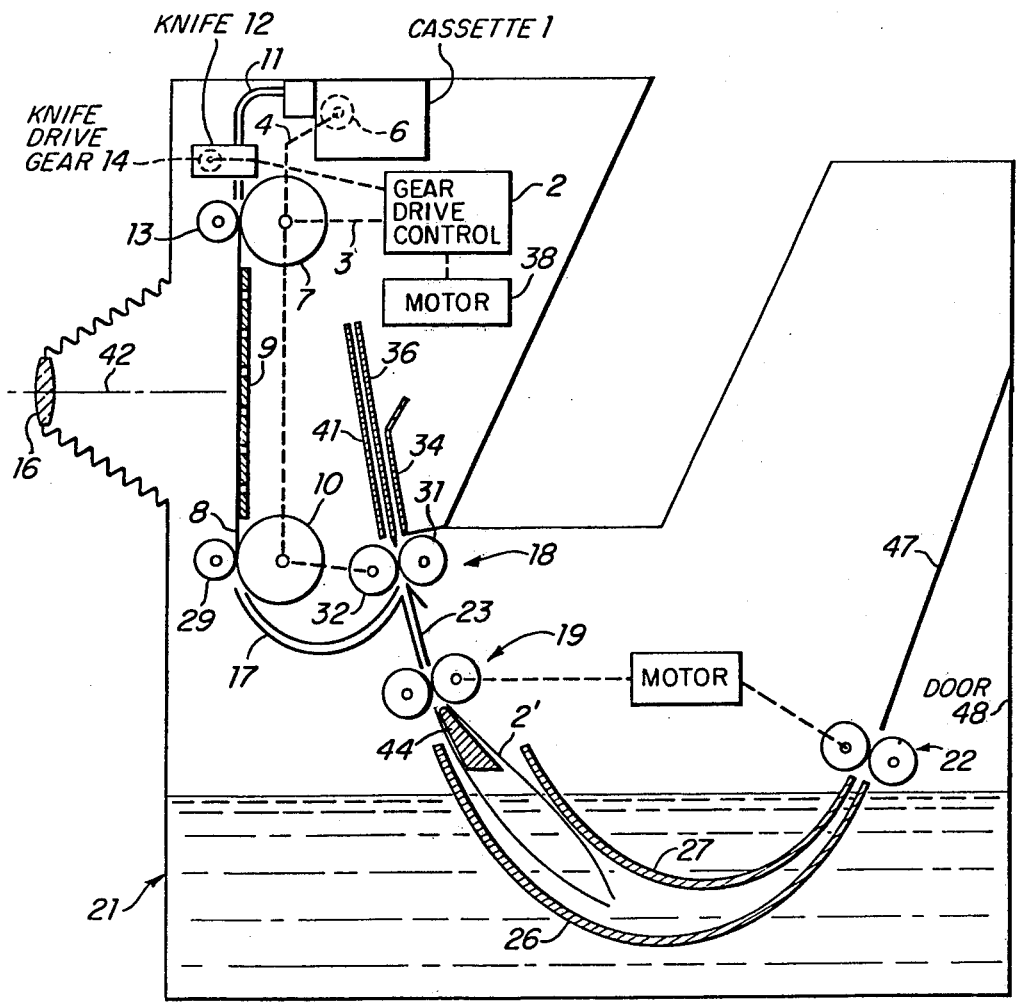

DIFFUSION TRANSFER CAMERA PROCESSOR

DESCRIPTION

1. Technical Field

This invention relates to the field of camera-processors.

2. Background Art

U.S. Pat. No. 3,257,926 illustrates a liquid bath configuration wherein the emulsion side of a negative film sheet faces an aluminum receptor sheet as the two sheets pass through the liquid bath. Diffusion transfer of the image takes place as the sheets pass through the bite of the output roller pair. In this patent the negative or light sensitive sheet is positioned above the receptor sheet. In the design of the camera processor of the present invention, the receptor sheets will often be relatively flimsy or flexible compared to the often relatively stiff film sheets, and it has been determined by experiment that the receptor sheet tends to float upwardly in the bath. This characteristic maintains good separation between the sheets as they pass through the bath, which is of considerable importance. It has also been found that the generally flexible receptor sheet will buckle if positioned below the film sheet, and good separation is not obtained due to the tendency of the receptor sheet to drift upwardly in the bath. Also, due to the U-shaped guide configuration, if the negative were on top, its tail would flip down off of the wedge (44) immediately, which pushes the liquid out from between the sheets and results in non-uniform development.

U.S. Pat. No. 3,203,335, in contrast with the above-mentioned patent, discloses an entire camera-processor. After the film sheet leaves the imaging station, it is introduced into a complex gripping mechanism which also grips the receptor sheet. This mechanism thereafter pulls both sheets through the bath, and diffusion transfer takes place at exit rollers 86 and 87. Thus, as in the case of the first mentioned patent, the receptor sheet is below the imaging sheet, which has been found to be unsatisfactory, as stated above. It is an object of the invention to eliminate the complex gripping mechanism of the second mentioned patent.

The first design approach involved exposing the film sheet in a magazine and thereafter sliding the magazine over to the developing station. This position shift of the film in the magazine was believed to be necessary since the receptor sheet would otherwise interfere with the imaging process as the emulsion side of the negative sheet must face the receptor sheet. Such a configuration, however, takes up considerable space, and thus, it is a further object of the camera-processor of the present invention to employ a machine configuration which is compact, and which eliminates the non-compact slidable magazine configuration. At the same time, the present camera-processor should be configured so that the often flimsy receptor sheet is oriented so that it passes through the processor bath above the negative sheet material.

DISCLOSURE OF AN EMBODIMENT OF THE INVENTION

Simplicity, compactness of the machine, the requirement that the film emulsion surface face the receptor sheet, and the requirement of having the receptor sheet oriented to pass through the processor bath above the negative sheet, were attained by causing the imaging film sheet to have its direction reversed, so that the film is driven upwardly somewhat parallel to the imaging platen, preferably by a single pair of drive rollers, and when the rollers drive the film upwardly, the receptor sheet merely remains in position at the bite of the rollers, due to the near vertical orientation of the sheet. The rollers are thereafter driven in an opposite direction to simultaneously drive the film and receptor sheets downwardly into the entrance of the processor bath, and thus, a single pair of rollers controls the handling of both sheets. Also, this simple configuration produces exact parallel alignment of the edges of both sheets at the roller nip.

DETAILED DESCRIPTION

The sole FIGURE illustrates a negative film storage cassette 1 which is driven by gear drive control means 2 via mechanical linkages 3 and 4. Drive control means 2 causes cassette gear 6 and first transport roller 7 to rotate counter clockwise which in turn causes belt 8 to be fed by roller 7 downwardly over vacuum platen 9. The film passes through cassette guide means 7 and roller 13. This action continues until the leading edge of the film is positioned at a predetermined distance from knife 12. Drive control 2 thereafter actuates knife drive gear 14 to cause the light sensitive material to be cut. The material is then transported to a position that is symmetrical about the optical axis by means of the porous belt 8. The material is held to the belt by means of a vacuum drawing through its porosity. Lens 16 thereafter projects an image upon the light sensitive material to expose it. The material could, of course, be cut before or after exposure of the light sensitive material. First guide means 17 facilitates the transportation of the sheet material through the second sheet transport means 18 until the trailing edge of the sheet is adjacent the upper entrance portion of the second transport means. The relatively flimsy receptor sheet is also introduced into the entrance portion of the second sheet transport means. A third sheet transport means 19, is used to drive the film into the processor 21 and a fourth sheet transport means 22 is used to press the light sensitive sheet and the receptor sheet together to transfer the image, squeegee off excess liquid, and cause the sheet to be driven out of the bath of procesor 21. A second sheet guide means 23 is employed to forward the two sheets to the third transport means 19. A third lower guide means 26 and a fourth upper guide means 27 is positioned within the bath to guide the sheets through processor 21.

After the light sensitive sheet is exposed, drive control means 2 again causes roller 7 and roller 6 to rotate counter clockwise, which causes the film to pass through the nip of rollers 6 and 29, through the first guide means 17 and through the nip of rollers 31 and 32 of the second transport means 18. Before this occurs, the generally flimsy receptor sheet is introduced between a fifth guide means 34 and a sixth guide means 36, so that the leading edge thereof is positioned at the nip of rollers 31 and 32 of the second sheet transport means 18. Also, guides 34 and 36 are oriented at an angle to provide a surface for the flimsy receptor sheet to lie on without it buckling and becoming misregistered with respect to the nip 18. Rollers 7, 6 and 32 are mechanically ganged together as is well understood by those skilled in the art, such ganging may be performed by employing a chain and sprocket, or belt and pully arrangement. Drive control means 2 is driven by motor 38 and the gear drive control means 2 actuates the transport means in either one direction or the other, depending upon the machine requirements set forth below. Such drive control means could take many forms. Details are omitted for clarity since they form no part of the present invention. A particularly efficient gear drive control means is the subject of a co-pending application in the name of Dennis Dodge, filed Oct. 19, 1979, Ser. No. 83,428, and assigned to the same assignee of the present invention.

After exposure, rollers 6, 7 and 32 are rotated counter clockwise to cause the sheet to pass through first guide means 17, through the nip of rollers 31, 32, and up within the chamber formed between the sixth guide means 36 and the seventh guide means 41. The trailing edge of the light sensitive sheet is now positioned at the entrance portion or nip of rollers 31 and 32. Although the receptor sheet is preferably inserted prior to the above described motion of the light sensitive sheet, the counter clockwise rotation of roller 32 will not adversely affect the positioning of the leading edge of the receptor sheet, and when the rotation of roller 32 ceases, the trailing edge of the light sensitive sheet is positioned at the nip of rollers 31 and 32 along with the leading edge of the receptor sheet. In fact, it aligns the sheets such that the edges are parallel and registered to the same line at the nip 18. It is an important feature of the present invention that the first guide means 17 causes the emulsion side of the light sensitive sheet to be positioned so that the emulsion side is now facing away from lens 16, which fulfills the design requirement of having the emulsion side face the receptor sheet and additionally, pass through processor 21 below the generally flimsy receptor sheet which floats upwardly against the fourth upper guide means 27 to maintain separation. This configuration eliminates the slidable magazine design approach mentioned in the introductory portion of this patent, and the result is a much more compact machine.

Second transport means 18 is now driven so that roller 32 turns clockwise and both sheets pass through the second guide means 23 through the nip of the rollers comprising the third transport means 19 and into the bath as illustrated. A simple wedge 44 causes the initial separation of the sheets as they enter the bath of processor 21. The generally flimsy receptor sheet 2 tends to float upwardly as illustrated so that the sheet is guided by the upper guide means 27 while the generally stiffer negative material does not float, so that good separation is maintained. The leading edges of the sheets thereafter pass through the nip of the rollers comprising the fourth sheet transport means 22 and the image is transferred to the receptor sheet, and the sheets are thereafter deposited upon surface 47. The door 48 of the machine is thereafter opened and the material is removed.

It should be understood that other components and configurations may be substituted for those described in order to practice the invention, and the invention is to be limited only by the permissable scope of the following claims. References are made in the claims to numbered components in the described embodiment, and it should be undertood that the claims are not to be restricted to such emboiments, as the numbers employed in the claims are merely exemplary of the nature of the claimed means.

DESCRIPTION OF THE DRAWINGS

The sole FIGURE illustrates a preferred embodiment of the invention.

We claim:

1. In a diffusion transfer camera-processor;
   a. projection lens means (16) for projecting an image along an optical axis (42);
   b. an imaging platen (9) for exposing a sheet of relatively stiff film to said image produced by said lens means;
   c. storage station (1) for storing said film;
   d. first film transport means (7, 13, 6 and 29) for driving said film from said storage station over said imaging platen so that an image may be thereafter projected upon the emulsion side of said film facing said optical axis;
   e. knife means (12) for cutting said film;
   f. second sheet transport means (31, 32);
   g. means for introducing the leading edge of a relatively flexible receptor sheet into an entrance portion of said second sheet transport means (34, 36);
   h. first guide means (17) for guiding the leading edge of said film from said first sheet transport means through said second sheet transport means, said first guide means being configured to reverse the direction of said film so that its emulsion side faces away from said optical axis after reversal thereof;
   i. drive control means (2) for driving said second sheet transport means in a first direction to position the trailing edge of said film adjacent said entrance portion of said second sheet transport means;
   j. a processor bath (21) having third and fourth sheet transport means (19, 22);
   k. second guide means (23);
   l. drive control means for driving said second sheet transport means in a second direction opposite said first direction for causing said film together with said receptor sheet to be driven into the entrance portion of said third sheet transport means via said second guide means; and
   m. a lower third and upper fourth guide means (26, 27) positioned within said processor bath between said third sheet transport means and said fourth sheet transport means for guiding said relatively flexible receptor sheet along said upper fourth guide means and said relatively stiff film along said lower third guide means and through said processor bath toward said fourth sheet transport means.

2. The combination as set forth in claim 1 wherein said means for introducing said receptor sheet into said second sheet transport means includes fifth and sixth guide means (34, 36) for supporting said flexible receptor sheet within a first chamber formed by said fifth and sixth guide means at one side of said sixth guide means.

3. The combination as set forth in claim 2 further including a seventh guide means (41) positioned to form a second chamber at the opposite side of said sixth guide means to support said film before said second sheet transport means drives said film and said receptor sheet towards said third sheet transport means.

4. The combination as set forth in claims 2, or 3 wherein said second transport means comprises a single pair of roller means positioned adjacent terminal portions of said fifth and sixth guide means.

5. The combination as set forth in claims 1, 2, or 3 wherein said first guide means is configured to reverse the direction of said film about 180°.

6. In a diffusion transfer camera-processor:
   a. projection lens means (16) for projecting an image along an optical axis (42);
   b. means for exposing a sheet of relatively stiff film to said image projected along said optical axis;
   c. storage station (1) for storing said film;
   d. first film transport means (7, 13, 6 and 29) for driving said film from said storage station over said means for exposing so that an image may be thereafter projected upon the emulsion side of said film facing said optical axis;
   e. second sheet transport means (31, 32);
   f. means for introducing the leading edge of a relatively flexible receptor sheet into an entrance portion of said second sheet transport means (34, 36);
   g. first guide means (17) for guiding the leading edge of said film from said first sheet transport means through said second sheet transport means, said first guide means being configured to reverse the direction of said film so that its emulsion side faces away from said optical axis after reversal thereof;
   h. drive control means (2) for driving said second sheet transport means in a first direction to position the trailing edge of said film adjacent said entrance portion of said second sheet transport means;
   i. a processor bath (21) having third and fourth sheet transport means (19, 22);
   j. drive control means for driving said second sheet transport means in a second direction opposite said first direction for causing said film together with said receptor sheet to be driven into the entrance portion of said third sheet transport means; and,
   k. lower and upper guide means (26, 27) positioned within said processor bath between said third sheet transport means and said fourth sheet transport means for guiding said relatively flexible receptor sheet along said upper guide means and said relatively stiff film along said lower guide means and through said processor bath toward said fourth sheet transport means.

7. The combination as set forth in claim 6 wherein said means for introducing said receptor sheet into said second sheet transport means includes a first outer and a central guide means (34, 36) for supporting said flexible receptor sheet within a first chamber formed at one side of said central guide means.

8. The combination as set forth in claim 7 further including a second outer guide means (41) positioned to form a second chamber at the opposite side of said central guide means to support said film before said second sheet transport means drives said film and said receptor sheet towards said third sheet transport means.

9. The combination as set forth in claims 7 or 8 wherein said second transport means comprises a single pair of roller means positioned adjacent first outer guide means.

10. The combination as set forth in claim 6, 7, 8, or 9 wherein said first guide means is configured to reverse the direction of said film about 180°.

11. In a diffusion transfer camera-processor:
   a. projection lens means (16) for projecting an image along an optical axis (42);
   b. means for exposing a sheet of film to said image projected along said optical axis;
   c. storage station (1) for storing said film;
   d. first film transport means (7, 13, 6 and 29) for driving said film from said storage station over said means for exposing so that an image may be thereafter projected upon the emulsion side of said film facing said optical axis;
   e. second sheet transport means (31, 32);
   f. means for introducing the leading edge of a receptor sheet into an entrance portion of said second sheet transport means (34, 36);
   g. first guide means (17) for guiding the leading edge of said film from said first sheet transport means through said second sheet transport means, said first guide means being configured to reverse the direction of said film so that its emulsion side faces away from said optical axis after reversal thereof;
   h. drive control means (2) for driving said second sheet transport means in a first direction to position the trailing edge of said film adjacent said entrance portion of said second sheet transport means;
   i. a processor (21) having sheet transport means (19, 22);
   j. drive control means for driving said second sheet transport means in a second direction opposite said first direction for causing said film, together with said receptor sheet to be driven into the entrance portion of said processor; and,
   k. guide means (26, 27) positioned within said processor for guiding said receptor sheet and said film through said processor.

12. The combination asset forth in claim 11 wherein said means for introducing said receptor sheet into said second sheet transport means includes a first outer and a central guide means (34, 36) for supporting said flexible receptor sheet within a first chamber formed at one side of said central guide means.

13. The combination as set forth in claim 12 further including a second outer guide means (41) positioned to form a second chamber at the opposite side of the central guide means to support said film before said second sheet transport means drives said film and said receptor sheet towards said third sheet transport means.

14. The combination as set forth in claims 12, 13 or wherein said second transport means comprises a single pair of roller means positioned adjacent said first outer guide means.

15. The combination as set forth in claims 11, 12 or 13, wherein said first guide means is configured to reverse the direction of said film about 180°.

* * * * *